United States Patent [19]
de Haas et al.

[11] Patent Number: 5,245,516
[45] Date of Patent: Sep. 14, 1993

[54] PORTABLE ILLUMINATION DEVICE

[76] Inventors: Joan O. de Haas; Mark de Haas, both of Box 404 R.D. 3, Hampton, N.J. 08827

[21] Appl. No.: 863,588

[22] Filed: Apr. 3, 1992

[51] Int. Cl.$^5$ .................... F21L 15/08; F21L 15/20
[52] U.S. Cl. ................................. 362/108; 362/84; 362/105; 2/338
[58] Field of Search .............. 362/84, 103, 105, 108, 362/253; 2/45, 160, 185 R, 199, 244, 331, 338; 224/203, 224, 257

[56] References Cited

U.S. PATENT DOCUMENTS

| | | | |
|---|---|---|---|
| 1,307,456 | 6/1919 | Prahar | 362/103 |
| 2,234,995 | 3/1941 | Waechter | 362/105 |
| 2,320,193 | 5/1943 | Powell et al. | 362/108 |
| 3,153,745 | 10/1964 | Gurian et al. | 362/103 |
| 3,317,722 | 5/1967 | Whitney | 362/84 |
| 3,944,803 | 3/1976 | Chao | 362/108 |
| 4,216,464 | 8/1980 | Terry | 362/103 |
| 4,523,258 | 6/1985 | Morse et al. | 362/108 |
| 4,581,271 | 4/1986 | Gordon | 2/311 |
| 4,901,211 | 2/1990 | Shen | 2/199 |
| 4,999,936 | 3/1991 | Calamia et al. | 362/103 |
| 5,045,979 | 9/1991 | Stevens | 224/224 |
| 5,067,063 | 11/1991 | Granneman et al. | 362/84 |

FOREIGN PATENT DOCUMENTS

| | | | |
|---|---|---|---|
| 0166534 | 1/1986 | European Pat. Off. | 362/105 |
| 30929 | 10/1960 | Finland | 362/105 |
| 2101288 | 1/1983 | United Kingdom | 340/432 |

Primary Examiner—Ira S. Lazarus
Assistant Examiner—Y. Quach

[57] ABSTRACT

A portable illumination device is provided by a combination of an elongated carrier, a source for electrical power mounted on the carrier, and a substantially planar light source coupled to the source for electrical power and mounted on the carrier in a coplanar manner. In a preferred embodiment of the invention, the carrier is adapted to be coupled to a belt, wherein the carrier is substantially transparent, the light is mounted on the carrier so that it is positioned between the belt and the carrier and it's light is directed through the carrier. In accordance with a further aspect of the invention, the carrier comprises a flexible strip of sheet plastic material, the light source comprises a flexible electroluminescent strip light and the source for power comprises a DC battery, DC to AC inverter, and an on/off switch.

15 Claims, 2 Drawing Sheets

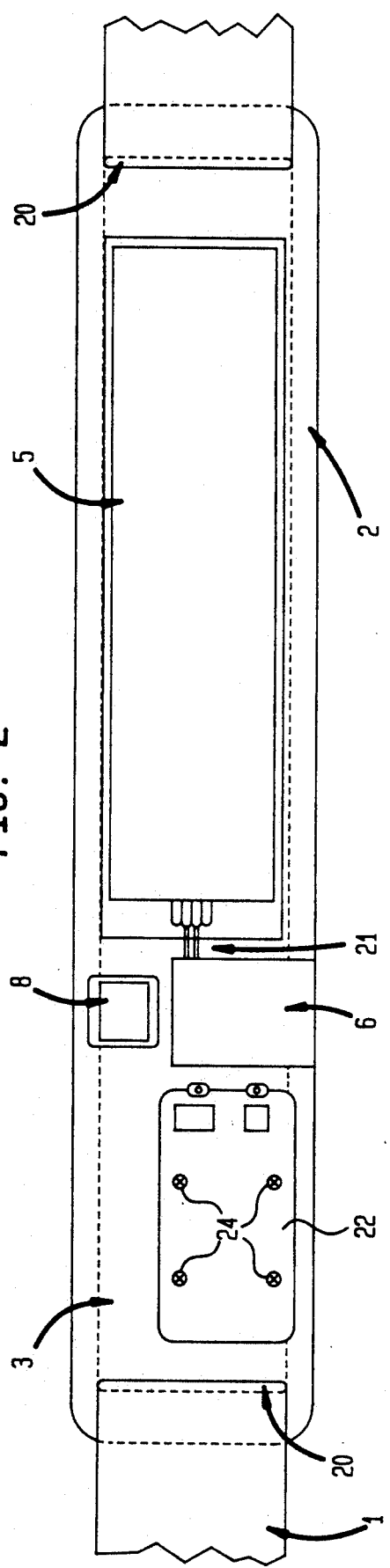
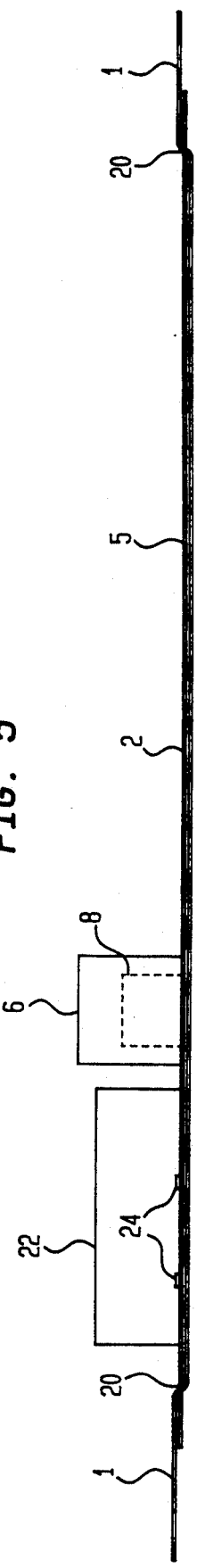

PORTABLE ILLUMINATION DEVICE

BACKGROUND OF THE INVENTION

1. Field of the Invention

The present invention relates to a portable illumination device, and more particularly, to a portable illumination device comprising a carrier having mounted thereon a planar light and light power source.

2. Description of the prior art

Typical prior art lighting for portable use consists of a DC power source, such as a battery, and an incandescent light. Such lights are not well suited for personal illumination, such as night safety lighting used when e.g., riding a bicycle, walking or jogging, etc, due to their bulk. Such prior art lights typically comprise a round or rectangular container having an interior adapted to hold a battery or batteries, and one or both ends or sides are adapted to hold a light bulb, reflector and lens assembly. The body of the container is then coupled to a belt or strap which is then worn by the user so as to allow "hands-free" use of the light. However, such combinations are not finding widespread usage, due to their relatively clumsy bulk, excess weight, poor weight distribution, and general inconvenience in use and application.

Reflective tape, or strips of material having light reflectors mounted thereon, are finding widespread use due to their light weight and ease of adaptability to various uses and surfaces. However, reflectors are somewhat deficient as a night safety device in that they only reflect incident light. They rely on a remote light source directed at the reflector, rather than providing light of their own.

It would be desireable to provide a portable illumination device which would not only have the light weight and flexibility characteristics of reflective tape or strips, but also have the ability to generate it's own light.

SUMMARY OF THE INVENTION

In accordance with a first aspect of the invention, a portable illumination device is provided by a combination of a flexible elongated carrier, a source for electrical power mounted on the carrier, and a flexible and substantially planar light source coupled to the source for electrical power and also mounted on the carrier. In a preferred embodiment of the invention, the carrier comprises a flexible strip of sheet plastic material, the light source comprises a flexible electroluminescent strip light and the source for electrical power comprises a DC battery, a DC to AC inverter, and an on/off switch.

In accordance with a further aspect of the invention a portable illumination device is provided by a combination of an elongated carrier, a source for electrical power mounted on the carrier, and a substantially planar light source coupled to the source for electrical power and also mounted on the carrier. The carrier is adapted to be coupled to a belt, wherein the carrier is substantially transparent, the light is mounted on the carrier so that it is positioned between the belt and the carrier and it's light is directed through the carrier. Furthermore, means are provided on a side of the carrier which is remote from the belt for actuating the power source.

In accordance with an even further aspect of the invention, a portable illumination device is provided by a combination of a substantially planar elongated carrier, a substantially planar electroluminescent light source mounted in a coplanar manner on the carrier, and a source for electrical power for the light source, which comprises a DC battery and a DC to AC inverter, also mounted on the carrier.

For a fuller understanding of the present invention, reference should now be made to the following detailed description of the preferred embodiments of the invention, to the accompanying drawings and to the claims.

BRIEF DESCRIPTION OF THE DRAWINGS

FIG. 2 illustrates a top view of details of the portable illumination device shown in FIG. 1;

FIG. 5 illustrates a side view of details of the portable illumination device shown in FIG. 2.

DETAILED DESCRIPTION OF THE INVENTION

Figure 1:
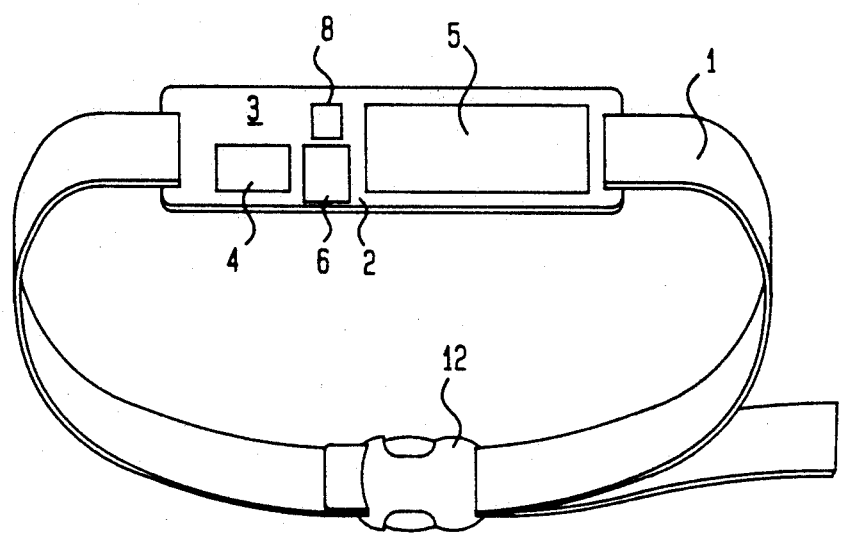
FIG. 1 illustrates a portable illumination device constructed in accordance with the principles of the invention.

FIG. 1 shows the portable illumination device of the invention coupled with a belt 1. The electrical components of the invention are mounted on a carrier 2 and comprise a source for electrical power 3 and a flat rectangular light source 5. In this first embodiment of the invention, the source for power 3 includes a battery 4, a DC to AC inverter 6 and an on/off switch 8. The carrier 2 is preferably slidably positioned on the belt 1 and then fixedly attached thereto via rivets or the like. The free ends of the belt 1 are adapted to be fastened together using a quick, side-release adjustable buckle 12. In use, the user may strap the belt 1 about his or her waist or diagonally across his or her back or chest, with the light source 5 facing away from the users body. The user may activate the portable illumination device by depressing the on/off switch 8.

In accordance with one aspect of the invention, both the carrier 2 and the light source 5 are constructed so as to be flexible. This combination of flexible light source and carrier is particularly advantageous in that it easily conforms to any one of many possible selectable positions, has good weight distribution and is therefore comfortable to wear. In a preferred embodiment of the invention, the carrier 2 comprises an elongated sheet of transparent plastic material, and the light source 5 may be constructed as a strip electroluminescent light, such as available from the Luminescent Systems Division of Loctite Corporation (located in New Hampshire), or Bonar Kardo Light Corporaton (located in King of Prussia, Pa.), as their model 2054BG electroluminescent lamp. Such a light source comprises a luminescent material sandwiched between upper and lower mylar sheets, which assembly is only 1/32 of an inch thick and is activated by application of an AC voltage of, e.g., between 50 and 120 volts AC.

This combination of materials is particularly advantageous since the light source 5 can be mounted to the underside of carrier 2 (i.e., on the side of carrier 2 facing belt 1 in a coplanar manner) using a flexible transparent adhesive, whereby belt 1 and carrier 2 provide physical protection for both sides of light source 5 while also allowing the light to shine through the carrier. In the preferred embodiment, a double sided transparent adhesive tape is used for mounting light source 5 to carrier 2. Furthermore, the electrical connections between the power source components and the light source 5 can be made on the side of the carrier which faces belt 1, thereby providing physical and environmental protection for the connections as well. Another advantage of this combination is that it provides a construction which is easily made waterproof and hence environmentally durable. For example, battery 4, inverter 6 and switch 8 could be purchased as waterproof items, and the connections between the components of power source 3 and light source 5 can be made using, e.g., an electrically conductive epoxy.

While light source 5 is illustrated as mounted on the underside of carrier 2, the components of power source 3 may be too smoothly fit between carrier 2 and belt 1, and in the illustrated embodiment they are mounted on the topside of carrier 2. However, irrespective of which side of carrier 2 includes the power source components, switch 8 must be accessible to the user for easy actuation when the carrier is being worn by the user.

Although a strip electroluminescent light source is used in the preferred embodiment, it should be understood that other types of flexible light sources could also be used, such as an array of LED's or even small incandescent bulbs. In these cases, the electrical power source would not have to provide an AC voltage, and hence the DC to AC inverter would not be required. In either embodiment, however, as will be described later on in conjunction with FIG. 3, it is desirable that power source 3 also includes a fixed or variable resistance R in its connection to light source 5 in order to establish a balance between the discharge rate of battery 4 and the intensity of the light emitted by light source 5.

Furthermore, although carrier 2 is shown mounted on a belt 1, in another embodiment of the invention the carrier itself could be long enough for some uses, and therefor belt 1 would not be required. In this case, means could be provided on the opposite ends of the carrier 2 which could releasably attach the ends together, such as "hook and loop" type enclosures commonly referred to as VELCRO (trademark).

Referring to FIGS. 2 and/or 5 as appropriate, elongated carrier 2 is shown having lateral slots 20 near it's free ends. Belt 1 is coupled to carrier 2 in a slidably positionable manner by passing belt 1 through slots 20 so as to pass along the underside of the central part of carrier 2. Carrier 2 preferably comprises a sheet of 1/32 inch transparent plastic material, such a LEXAN (trademark), and has light source 5 adhered to its underside using, e.g., a flexible transparent adhesive tape, so that its light is directed through carrier 2 and out its top side. As previously noted, light source 5 preferably comprises a strip electroluminescent light, such as available from Luminescent Systems Division of Loctite Corporation or from Bonar Kardo Light, as their model 2054BG electroluminescent lamp.

The components of power source 3 are mounted on the top side of carrier 2 due their relative thickness as compared to light source 5, but would preferably be mounted on the bottom side of carrier 2 to also have the benefit of two-sided protection by being sandwiched between carrier 2 and belt 1. When mounted on the top side of carrier 2, the electrical terminals of the battery 4, inverter 6 and switch 8 are made accessible to the underside of carrier 2 via strategically placed holes (not shown) in carrier 2. Then, a conductive epoxy, or other type of waterproof electrical interconnection which is able to be integrated into an automated assembly operation (such as copper traces on a flexible mylar circuit board) is used on the underside of carrier 2 to provide the necessary electrical interconnections. Electrical conductors 21 which provide AC power from inverter 6 to light source 5 are illustrative of these electrical connections.

Although inverter 6 and switch 8 are mounted to carrier 2 using an epoxy, battery 4 is mounted to carrier 2 using a battery holder 22 having screws 24, some of which pass through both carrier 2 as well as through belt 1, thereby fixing the position of carrier 2 on belt 1.

The approximate dimensions of the components of the portable illumination device are as follows:

|  | length | width | thickness |
|---|---|---|---|
| carrier 2 | 10½" | 2" | 1/32" |
| lamp 5 | 5" | 1" | 1/32" |
| inverter 6 | 13/16 | 1¼" | 15/16" |
| switch 8 | 15/16" | 15/16" | 9/16" |
| battery older 22 | 2 1/16" | 1¼" | ¾" |

It is noted that battery 4 may comprises a conventional 9 volt DC battery preferably of the long life alkaline type, or an other type of DC source, such as rechargeable NiCad batteries. Inverter 6 comprises a switching type inverter such as available from the forenoted Loctite Corporation as model number 7113-6.

Figure 3:
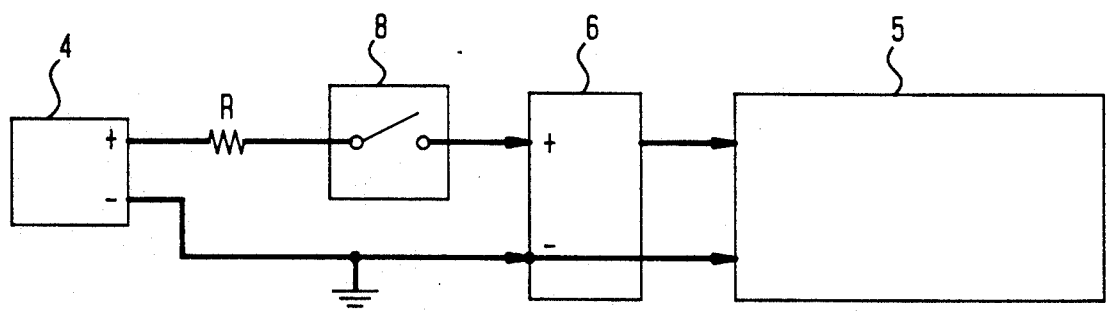
FIG. 3 illustrates an electrical schematic of the portable illumination device shown in FIG. 1.
Figure 4A:
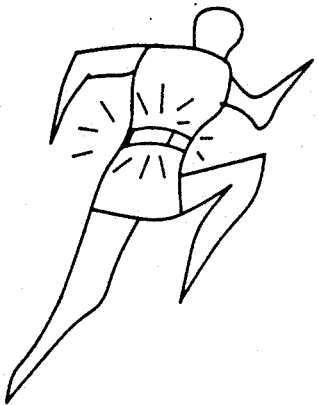
FIGS. 4a and 4b illustrate various uses of the portable illumination device shown in FIG. 1.
Figure 4B:
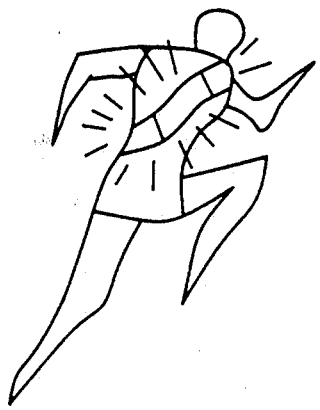

FIG. 3 illustrates a simplified schematic diagram for the electrical connections of the Portable illumination device of FIG. 1. The negative pole of battery 4 serves as the reference potential for the device, and is therefor coupled to both the negative input of inverter 6 and one input of light source 5. The positive pole of battery 4 is connected to the positive input of inverter 6 via switch 8 and a limiting resistor R. In the preferred embodiment, R is 27 ohms, however, it may be desirable to make R a variable resistor so that the user may control the battery life/light brightness tradeoff.

Thus, there has been shown and described a novel portable illumination device which fulfills all the objects and advantages thereof. Many changes, modifications, variations and other uses and applications of the subject invention will, however, become apparent to those skilled in the art after considering this specification and its accompanying drawings which disclose preferred embodiments thereof. For example, light source 5 could comprise an incandescent bulb to supply light to a fiber optic bundle which is then spread out to form a plane of light similar to the forenoted electroluminescent lamp. All such changes, modifications, variations and other uses and applications which do not depart from the spirit and scope of the invention are deemed to be covered by the invention which is limited only by the claims which follow.

What we claim is:

1. A portable illumination device, comprising:
   a component carrier, said component carrier having a shape which is substantially planar and elongated so as to have a given length, and comprising a material which is substantially flexible and transparent;
   a source for electrical power mounted on the component carrier;

a light source having a shape which is substantially planar and elongated and comprising materials which are substantially flexible coupled to the source for electrical power and also mounted on the component carrier; and a belt comprising a flexible material and having a length which is longer than the length of said component carrier and adapted to be worn by a user of the portable illumination device, wherein said component carrier includes connection means for mechanically connecting and controllably positioning in a coplanar manner said component carrier including said light source and said source for electrical power to any one of a plurality of user desired positions along the length of said belt.

2. The portable illumination device of claim 1, wherein:

said light source comprises a planar electroluminescent light source mounted in a coplanar manner on a side of said component carrier which, when mounted on said belt, faces said belt.

3. The portable illumination device of claim 2, wherein:

said source for electrical power comprises a battery, and a DC to AC inverter.

4. The portable illumination device of claim 3, wherein:

said source for electrical power also includes a limiting resistor coupled in series with said battery, and an on/off switch coupled to said source for electrical power so as to controllably activate said light source.

5. The portable illumination device of claim 1, wherein:

said light source is mounted on a bottom side of said component carrier so as to directs it's light through said component carrier when said component carrier is mounted on said belt.

6. The portable illumination device of claim 5, wherein;

electrical interconnections between said light source and said source for electrical power are mounted on said bottom side of said component carrier.

7. The portable illumination device of claim 6, further including:

said belt having its free ends adapted to be coupled together via a buckle, and said component carrier is attached to said belt with its bottom side facing said belt.

8. The portable illumination device of claim 1, further including:

controllable switch means mounted on said component carrier, which can be controlled from a top side of said component carrier for controlling application of electrical power to said light source.

9. The portable illumination device of claim 1, wherein:

said component carrier and said belt each have a width associated with their shape, the width of said component carrier being greater than the width of said belt, and said connection means comprises two spaced-apart elongated slots formed in said component carrier and extending across its width by an amount substantially equal to the width of said belt.

10. A portable illumination device, comprising:

a component carrier, said component carrier having a shape which is substantially planar and elongated so as to have a given length, and comprising a material which is substantially flexible;

a source for electrical power mounted on the component carrier;

a substantially planar light source coupled to the source for electrical power and mounted in a coplanar manner on the component carrier;

a belt comprising a flexible material and having a length which is longer than the length of said component carrier and adapted to be worn by a user of the portable illumination device; and connection means included in a coplanar manner with said component carrier for attaching said component carrier to said belt at any user desired position along its length, and furthermore wherein the material of said component carrier is rigid enough so as to support said source for electrical power and said substantially planar light source in a fixed spatial relationship with respect to each other as said component carrier is positioned by said user on said belt.

11. The portable illumination device of claim 10, wherein:

said component carrier comprises a substantially transparent material; and said substantially planar light source is mounted on a bottom side of said component carrier so as to direct its light through said component carrier, said substantially planar light source being physically protected by its positioning between said component carrier and said belt.

12. The portable illumination device of claim 11, further including:

a controllable switch means coupled to said source for electrical power and mounted on said component carrier so as to be controlled from a top side of said component carrier for controlling application of electrical power to said substantially planar light source.

13. The portable illumination device of claim 12, wherein;

said light source comprises an electroluminescent substantially planar light source; and said source for electrical power comprises a DC battery and a DC to AC inverter.

14. The portable illumination device of claim 13, further including:

means for providing electrical interconnections between said source for electrical power and said substantially planar light source, said means for providing electrical interconnections being provided on the bottom side of said component carrier.

15. The portable illumination device of claim 10, wherein:

said component carrier and said belt each have a width associated with their shape, the width of said component carrier being greater than the width of said belt, and said connection means comprises two spaced-apart elongated slots formed in said component carrier and extending across its width by an amount substantially equal to the width of said belt.

* * * * *